United States Patent
Medeiros (12)

(10) Patent No.: US 6,311,010 B1
(45) Date of Patent: Oct. 30, 2001

(54) VARIABLE OPTICAL ATTENUATOR WITH LOCKING MECHANISM

(75) Inventor: Anthony W. Medeiros, Bradenton, FL (US)

(73) Assignee: Telephone Services, Inc. of Florida, Riverview, FL (US)

(*) Notice: Subject to any disclaimer, the term of this patent is extended or adjusted under 35 U.S.C. 154(b) by 0 days.

(21) Appl. No.: 09/441,591

(22) Filed: Nov. 17, 1999

(51) Int. Cl.[7] ............................................. G02B 6/00
(52) U.S. Cl. ............................ 385/140; 385/60; 385/58; 385/55; 385/70; 385/72
(58) Field of Search ............................. 385/140, 134, 385/60, 58, 55, 53, 72, 70

(56) References Cited

U.S. PATENT DOCUMENTS

| | | |
|---|---|---|
| 4,181,401 | 1/1980 | Jensen . |
| 4,261,640 | 4/1981 | Stankos et al. . |
| 4,852,959 | 8/1989 | Werner et al. . |
| 4,893,889 | 1/1990 | Iwakiri et al. . |
| 4,986,627 | 1/1991 | Boscher et al. . |
| 5,031,994 | 7/1991 | Emmons . |
| 5,136,681 | 8/1992 | Takahashi . |
| 5,147,348 | 9/1992 | Leckrone et al. . |
| 5,216,733 | 6/1993 | Nagase et al. . |
| 5,319,733 | 6/1994 | Emmons et al. . |
| 5,321,790 | 6/1994 | Takahashi et al. . |
| 5,347,604 | 9/1994 | Go et al. . |
| 5,384,885 | 1/1995 | Diner . |
| 5,561,726 | 10/1996 | Yao . |
| 5,659,645 | 8/1997 | Satake . |
| 5,677,977 | 10/1997 | Smith . |
| 5,684,912 | 11/1997 | Slaney et al. . |
| 5,694,512 | 12/1997 | Gonthier et al. . |
| 5,706,379 | 1/1998 | Serafini et al. . |
| 5,727,109 | 3/1998 | Pan et al. . |
| 5,805,760 | 9/1998 | Serafini et al. . |
| 5,897,277 | 4/1999 | Barré et al. . |
| 5,897,803 | 4/1999 | Zheng et al. . |
| 6,048,102 | * 4/2000 | Fukushima ............................ 385/72 |
| 6,102,581 | * 8/2000 | Deveau et al. ......................... 385/56 |

FOREIGN PATENT DOCUMENTS

| | | |
|---|---|---|
| 52-64950 | 5/1977 | (JP) . |
| 2-281224 | 11/1990 | (JP) . |

\* cited by examiner

*Primary Examiner*—Rodney Bovernick
*Assistant Examiner*—Sung Pak
(74) *Attorney, Agent, or Firm*—Sonnenschein Nath & Rosenthal

(57) ABSTRACT

The present invention relates to a variable optical attenuator having a first housing and second housing that interlock with one another such that the first housing is able to rotate both clockwise and counterclockwise 360 degrees relative to the second housing without any movement between the housings and along the x-axis. Additionally, the first housing member of the present invention has exterior rings that align with interior grooves of the second housing member. Thus, the distance between the end of the fibers can be varied by securing the exterior circular rings on the first housing with different interior grooves on the second housing.

8 Claims, 5 Drawing Sheets

VARIABLE OPTICAL ATTENUATOR WITH LOCKING MECHANISM

FIELD OF THE INVENTION

The present invention relates to attenuators for use in fiber optic communication systems, and more particularly, fiber optic attenuators that allow the amount of fiber optic power in a fiber optic transmission to be adjusted incident to a change in amplitude of the transmission signal.

BACKGROUND OF THE INVENTION

As background, optical fiber attenuators are used for optical signal-power reduction mainly in short distance telecommunication links and in long distance trunk lines with signal repeaters having a fixed amplification. Whenever the optical signal power is higher than the range of the detectors, the optical signal needs to be lowered. Lowering the signal is accomplished by an attenuator.

While there are a variety of different attenuators, the present invention relates to a mechanical attenuator. Fiber can be attenuated mechanically in several ways. One method of attenuation is attained through bending or bundling of the fiber as illustrated in Smith U.S. Pat. No. 5,677,977 and Slaney et al. U.S. Pat. No. 5,684,912, thereby distorting the fiber and causing optical loss through the fibers. Another method of attenuation involves distorting the diameter of the fiber by heating the fiber and then compressing or pulling the cable to change its diameter, as disclosed in Takahashi et al. U.S. Pat. No. 5,321,790. Yet another method of attenuation involves axially aligning two fibers with a gap between the ends of the fibers. Air between the gap can then be used to attenuate, or the gap can be filled with a density filter or film type optical attenuator as disclosed in Serafini et al. U.S. Pat. Nos. 5,706,379 and 5,805,760.

The mechanical attenuator of the present invention is an attenuator that utilizes an air gap between the end of two fibers to attenuate the transmission signal. Typically, an attenuator having an air gap between the fiber attenuates in one of three ways. The first type of attenuation is transverse attenuation and occurs by offsetting the axes of the fiber such that the axes of the fiber remain parallel to one another. The second type of attenuation is angular attenuation, which occurs by varying the angle of the end of the fibers relative to one another. Finally, the third type of attenuation is longitudinal attenuation, which is achieved by varying the distance of the gap between the ends of two axially aligned fibers.

In the prior art, those attenuators that teach variable attenuation through angular attenuation typically angle the ends of the axially aligned cables at a fixed distance apart, as shown in FIGS. 1 and 2, and rotate one fiber relative to the other to vary the amount of attenuation. When one end fiber is rotated relative to the other, the opposing tangent planes of the ends of the fibers move from being generally parallel to one another to being offset by as much as 20 to 40 degrees. Thus, the attenuation can be increased and decreased by simply turning one ferrule relative to another.

The prior art attenuators that teach angular attenuation also teach the rotation between the fibers to be adjustable between 0 to 180 degrees. FIG. 1 illustrates a prior art attenuator in its resting position, with no rotation between the fibers. In contrast, FIG. 2 illustrates a prior art attenuator with 180 degree rotation between the fibers. Rotation between the fibers allows for an increase in attenuation as the fiber is rotated in one direction and a decrease in attenuation when the fiber is rotated in the opposing direction. By only allowing for an increase in attenuation in one direction, a field technician must, for each attenuator he encounters, determine which direction (clockwise or counterclockwise) provides an increase in attenuation and which provides a decrease.

To improve upon the prior art, the present invention provides for the 360 degree rotation of one fiber end 28 relative to the other (FIG. 3). Unrestricted rotation of the ferrule 28 allows the optical signal to be both increased and decreased by rotating the first housing 12 in only one direction. Additionally, to achieve further variation in the amount of attenuation, in one embodiment of the present invention, the predetermined distance between the ferrules 28 can be varied by changing the interior alignment of the first housing member relative to the second housing member.

SUMMARY OF THE INVENTION

Accordingly, the principal object of the present invention is to provide a mechanical attenuator that allows for the 360 degree rotation of one fiber end relative to the other, such that the optical signal can be both increased and decreased by rotating one end of the fiber in only one direction, either clockwise or counter-clockwise. Yet another object of the present invention is to provide a variable optical attenuator that not only allows for the unrestricted rotation of one end of a fiber relative to the other, but also allows one to adjust the amount of longitudinal attenuation by varying the distance between the ends of the two aligned fibers.

To achieve these objectives, the variable optical attenuator of the present invention is comprised of a first aluminum housing and second aluminum housing. The first aluminum housing interlocks with the second aluminum housing such that the first housing is able to rotate both clockwise and counterclockwise 360 degrees relative to the second housing without any movement between the housings and along the x-axis. Additionally, in the preferred embodiment, the first housing member of the present invention has exterior rings that align with interior grooves of the second housing member. Thus, the distance between the end of the fibers can be varied by securing the exterior circular rings on the first housing with different interior grooves on the second housing.

These and other objects and advantages of the present invention will be clarified in the following description of the preferred embodiment in connection with the drawings, the disclosure and the appended claims, wherein like reference numerals represent like elements throughout.

DESCRIPTION OF THE DRAWINGS

FIG. 3A is a front view of the first housing of the present invention, with the ferrule removed, viewed along line 3a—3a.

FIG. 8A is a cross sectional view of the first housing member illustrated in FIG. 8 taken along line 8a—8a.

DESCRIPTION OF THE PREFERRED EMBODIMENT

Figure 1:
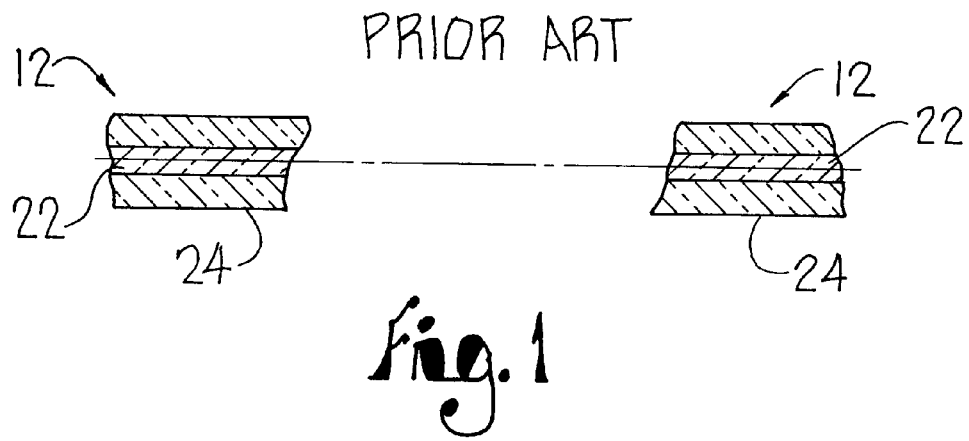
FIG. 1 is an enlarged view of an attenuation mechanism of a prior art optical attenuator, wherein the fibers are in original alignment with one another.
Figure 2:
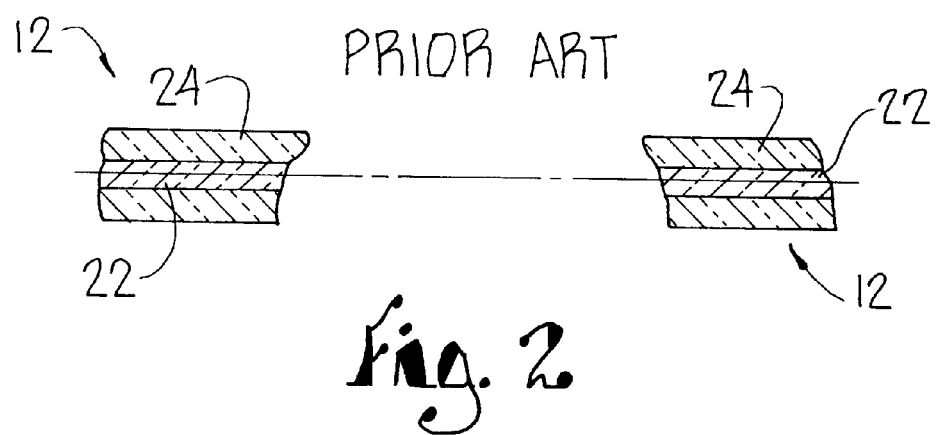
FIG. 2 is an enlarged view of an attenuation mechanism of the prior art optical attenuator as illustrated in FIG. 1, showing a fiber end rotated 180 degrees relative to the other.
Figure 3:
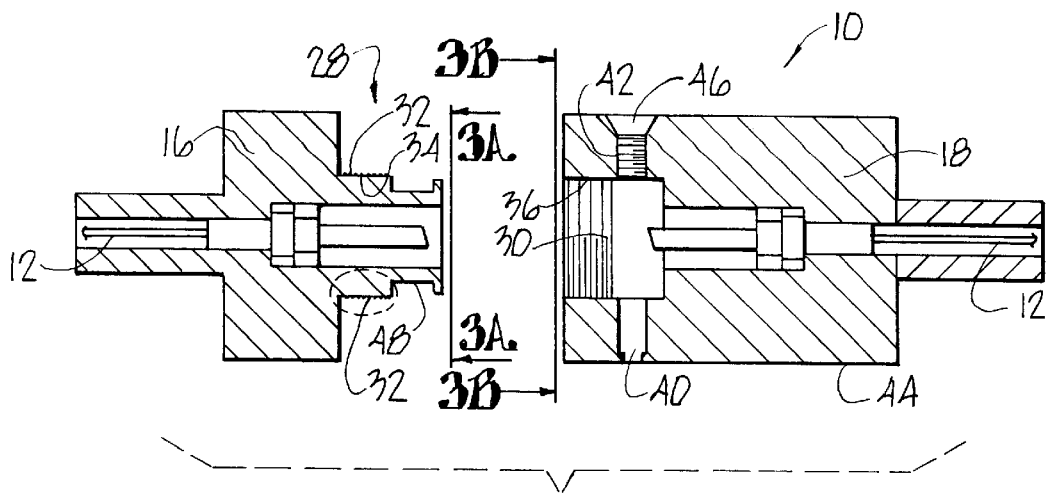
FIG. 3 is a front elevational view of a first embodiment of the variable optical attenuator illustrating the separate housing members of the present invention.
Figure 3C:
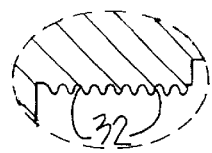
FIG. 3C is an enlargement showing the rings in a housing depicted in the circle of FIG. 3.
Figure 3A:
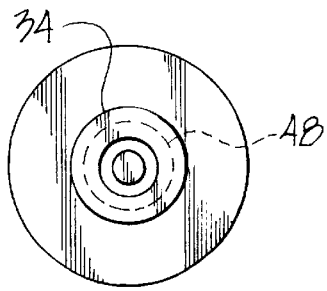
Figure 3B:
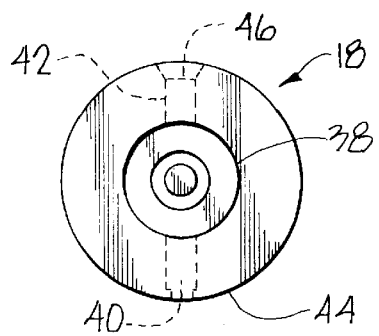
FIG. 3B is a front view of the second housing of the present invention, with the ferrule removed, viewed along line 3b—3b.

As can be seen in all the figures, but as best illustrated by FIGS. 3, 3A and 3B, the present invention relates to a variable optical attenuator 10 housing two optical fibers 12 that are axially aligned with one another through the use of ferrules 14. As seen in attached FIG. 3, the optical attenuator 10 of the present invention is comprised of a first aluminum housing 16 and second aluminum housing 18. The first aluminum housing 16 interlocks with the second aluminum housing 18 such that the first housing 16 is able to rotate both clockwise and counterclockwise 360 degrees relative to the second housing 18 without any movement between the housings 16 and 18 along the x-axis.

Figure 4:
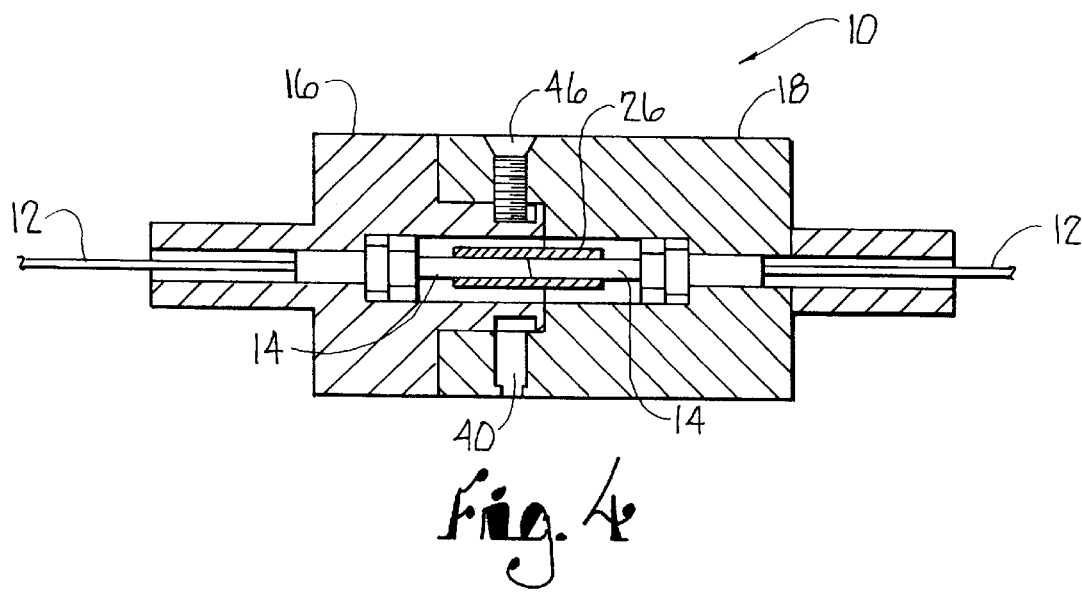
FIG. 4 is a front elevational view of the first embodiment of the present invention illustrating the attenuator in the closed position with the end faces of the fiber optic cables abutting one another.
Figure 5:
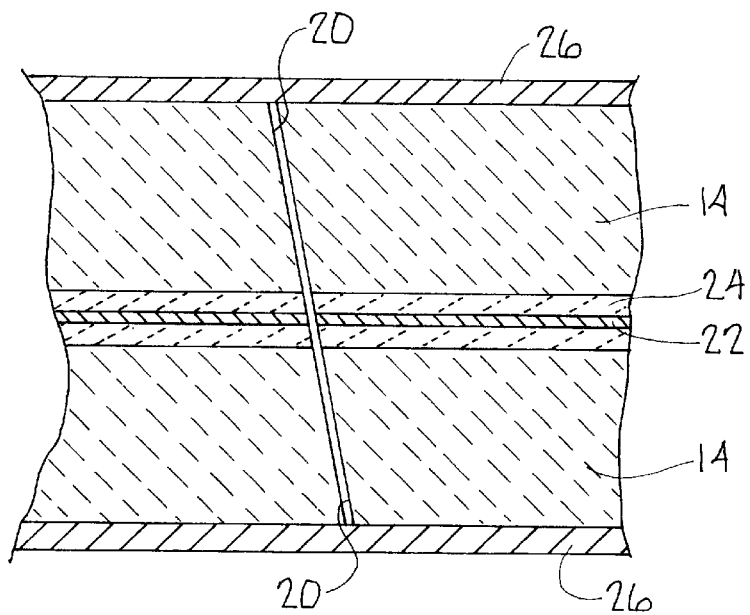
FIG. 5 is a cross sectional view of the attenuation mechanism of the present invention as illustrated in FIG. 4.
Figure 6:
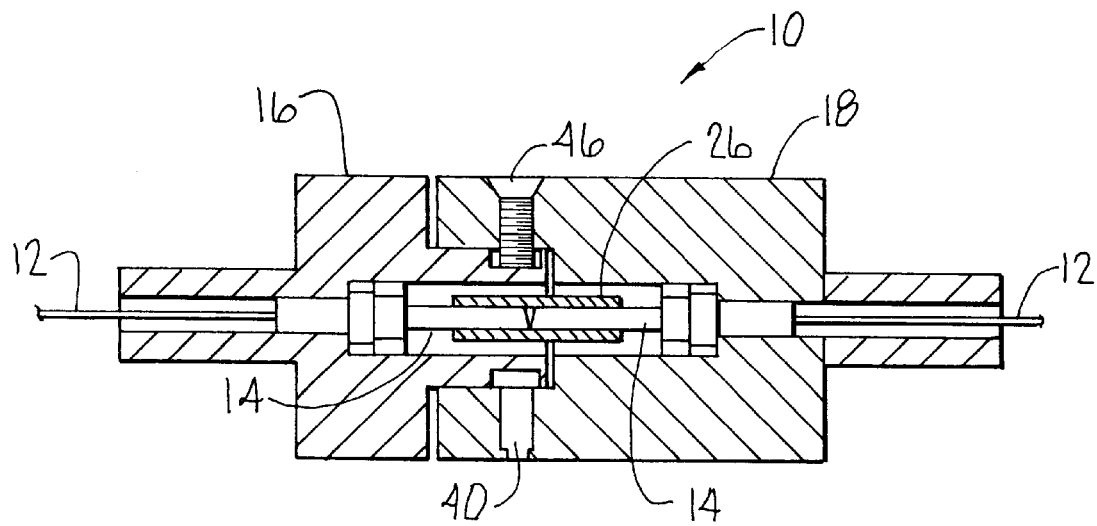
FIG. 6 is a front elevational view of the first embodiment of the present invention illustrating the attenuator in an open position having an air gap between the end faces of the cables.
Figure 7:
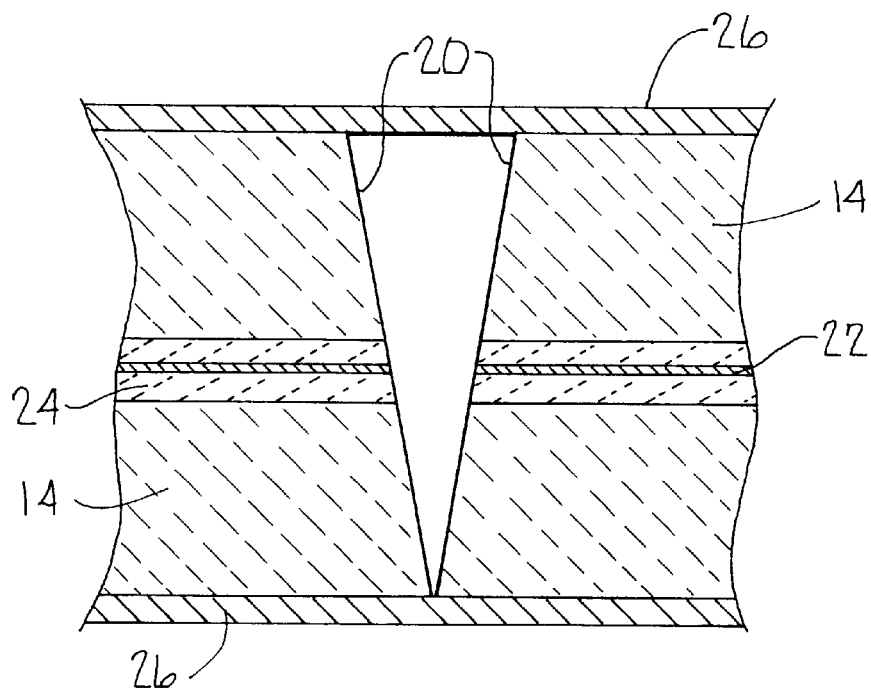
FIG. 7 is a cross sectional view of the attenuation mechanism of the present invention as illustrated in FIG. 6.

As illustrated in the attached FIGS. 3, 4 and 6, each housing 16 and 18 has a hollow central portion for retaining a ferrule 14. Each ferrule 14 has a central bore (not shown) which allows an optical fiber 12 to pass through the center of each ferrule 14. The ferrules 14 are preferably formed of zirconium, but may also be formed of ceramic or drawn glass.

Each ferrule 14 has an angled surface 20 that is finished by polishing the surface 20 such that each surface 20 creates a 7 to 20 degree angle, but preferably a constant eight degree (8°) angle, with respect to the plane perpendicular to the optical axis of the optical fiber 12. Each optical fiber 12 held within each ferrule 14 includes a fiber core 22 surrounded by cladding 24. Such optical fibers 12 are well known in the telecommunications industry. Each fiber optic cable 12 terminates at the angled surface 20 of the ferrule 14 and is polished in alignment with the angled surface 20 such that the terminal end of each fiber optic cable 12 is in a tangential plane with the angled surface 20 of the ferrule 14.

Additionally, as illustrated in FIGS. 4–7, an alignment sleeve 26, preferably a zirconium alignment sleeve such that the sleeve expands and contrasts at the same rate as the ferrules 14, is provided for retaining the ferrules 14 in axial alignment with one another. With the ferrules 14 disposed within the sleeve 26, the ferrules 14 may be rotated relative to one another about the xaxis such that the fiber cores 22 remain in alignment with one another.

As illustrated in FIGS. 3, 3A and 3B, the first housing 16 has a protruding circular hollow member 28 that fits within a cavity 30 in the second housing 18. In the preferred embodiment, the circular hollow member 28 of the first housing 16 has a series of rings 32 that extend about the exterior circumference 34 of the hollow member 28. As shown in FIGS. 4 and 6, when the circular hollow member 28 is positioned within the cavity 30 of the second housing 18, the rings 32 of the circular hollow member 28 are aligned with a corresponding series of grooves 36 about the interior circumference 38 of the cavity 30 of the second housing 18.

The circular hollow member 28 is not threaded, but each ring 32 on the circular hollow member 28 fits within one corresponding groove 36 in the cavity 30 of the second housing 18. This allows the first housing 16 to rotate 360 degrees relative to the second housing 18 without any movement between the housings 16 and 18 along the x-axis.

As seen in FIGS. 3, 4 and 6, the second housing 18 provides two opposing bores 40 and 42 commencing at the exterior circumference 44 of the second housing 18, extending through the housing 18 and opening into the cavity 30. The first bore 40 is designed to accommodate a set pin (not shown), which is used to secure the first housing 16 to the second housing 18 without prohibiting the rotation of the first housing 16 relative to the second housing 18. Rotation can, however, be restricted through the use of a countersunk bolt 46 as seen in FIGS. 3, 4 and 6.

The circular hollow member 28 is also provided with a recess 48 that extends around the exterior circumference 34 of the circular hollow member 28. When the circular hollow member 28 of the first housing 16 is positioned within the second housing 18, the recess 48 aligns with the two bores 40 and 42 in the second housing member 18, such that the set pin (not shown) when positioned within the first bore 40 extends through the second housing 18 and into the recess 48 of the circular hollow member 28. Thus, the set pin is used to secure the first housing 16 within the second housing 18 without restricting rotational movement. While the ring 32 and groove 36 alignment could alone maintain the first housing member 16 interlocked with the second housing member 18, the set pin is provided to further secure the housing members 16 and 18 against one another.

The second bore 42 is designed to accommodate a bolt 46 that can be countersunk into the second bore 42. The bolt 46 can be positioned within the bore 42 such that the bolt can extend through the second housing 18 and into the cavity 30. Again, when the circular hollow member 28 of the first housing 16 is positioned with the cavity 30 of the second housing 18, the second bore 42 aligns with the recess 48 in the circular hollow member 28. The bolt 46 can then extend into the recess 48 of the circular hollow member 28. The tightening of the bolt 46 against the recess 48 of the circular hollow member 28 functions to restrict the rotational movement of the first housing 16 relative to the second housing 18. To allow rotational movement between the first and second housings 16 and 18, the bolt 46 is then retracted away from the recess 48.

Additionally, the predetermined distance between the cores 22 of the fibers 14 can be adjusted by aligning the rings 32 with different grooves 36 in the cavity 30 of the second housing member 18, as illustrated by FIGS. 4 and 6. FIG. 4 illustrates the rings 32 and grooves 36 of the first and second housing members 16 and 18 in corresponding alignment with one another and the ferrules 14 in original alignment (0 degrees of rotation) with little, if any, distance between the ferrules 14. In contrast, FIG. 6 illustrates the first ring 32 of the first housing 16 aligned with the second groove 36 of the second housing 18. To allow for the offset, the recess 48 must be designed to be wide enough to accommodate the bolt 46 and the set pin when the longitudinal alignment of the housings 16 and 18 is varied. This ability to offset alignment allows one to vary the longitudinal distance between the fibers 12, which provides for different levels of attenuation when the fibers 12 are rotated 0 to 360 degrees relative to one another. Thus, the embodiment of the present invention by utilizing rings 32 and grooves 36 can vary the amount of attenuation both longitudinally and angularly.

Figure 8:
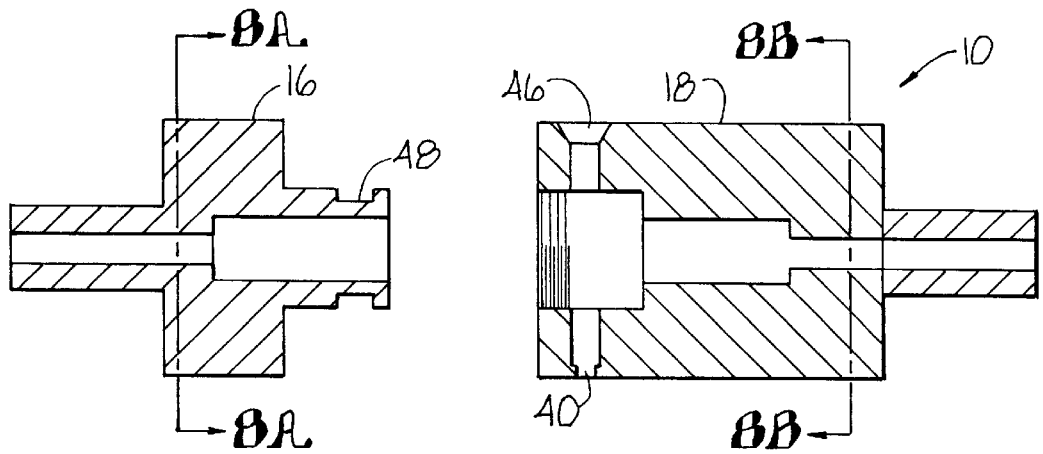
FIG. 8 is a front elevational view of a second embodiment of the variable optical attenuator illustrating the separate housing members of the present invention.
Figure 8A:
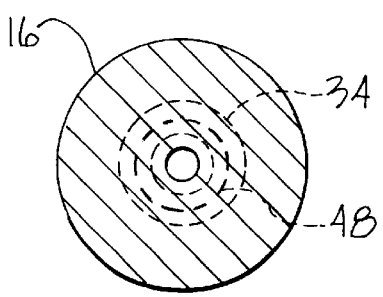
Figure 8B:
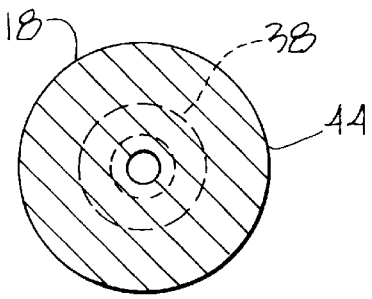
FIG. 8B is a cross sectional view of the second housing member illustrated in FIG. 8 taken along, line 8b—8b.

In another embodiment illustrated in FIGS. 8, 8A and 8B, the attenuator 10 is designed without the ring 32 and groove 36 engagement between the two housings 16 and 18. Only a set pin (not shown) is used to maintain the first housing 16 against the second housing 18. To keep the ferrules 14 in further axial alignment, an alignment sleeve 26 (as shown in FIGS. 4–7) or other holding member is used. In this embodiment, the distance between the core 22 of the fibers 12 is fixed and cannot be varied. Thus, this embodiment only provides for the 360 degree rotation between the fibers 12.

In operation, as illustrated by FIGS. 3–8, when the two housings 16 and 18 are engaged, the angled surfaces 30 of the two ferrules 14 are axially aligned along the x-axis and are separated from one another by a predetermined distance. Since the housings 16 and 18 are not engaged through a threaded mechanism, the distance between the cores 22 of the fibers 12 is fixed and is not changed by the rotation of the first housing 16 relative to the second housing 18. As one ferrule 14 rotates relative to the other ferrule 14, the opposing tangential planes of the terminal ends of the fiber optic cable 12 are offset, as shown in FIGS. 4, 5, 6 and 7, which creates the attenuation of the optical signal. Thus, by rotating the first housing 16 three hundred and sixty degrees (360°) relative to the second housing 18, one can increase, as well as decrease the amount of attenuation by rotating the first housing member 16 in either the clockwise or counterclockwise direction. Once the desired amount of attenuation is achieved, the bolt 46 can be tightened against the first housing member 16 to prevent further rotational movement and maintain a constant attenuation.

Although the foregoing detailed description of the present invention has been described by reference only to two alternative embodiments, and the best mode contemplated for carrying out the present invention has been herein shown and described, it will be understood that modifications or variations in the structure and arrangement of this embodiment other than those specifically set forth herein may be achieved by those skilled in the art and that such modifications are to be considered as being within the overall scope of the present invention. Therefore, it is contemplated to cover the present invention and any and all modifications, variations, or equivalents that fall within the true spirit and scope of the underlying principles disclosed and claimed herein. Consequently, the scope of the present invention is intended to be limited only by the attached claims.

I claim:

1. A variable optical attenuator comprising:
    a first housing for maintaining a first optical cable having a core;
    a second housing for maintaining a second optical cable having a core;
        wherein said first housing interconnects with said second housing such that the core of said first optical cable is maintained in axial alignment with the core of said second optical cable and is maintained at a pre-determined distance;
    an interlock between said first housing and said second housing;
        wherein said interlock permits said first housing to be positioned at any position between zero degrees (0°) and three hundred and sixty degrees (360°) relative to said second housing without varying said pre-determined distance between the core of the first optical cable and the core of the second optical cable and
        wherein said interlock permits the rotation of said first housing relative to said second housing in either the clockwise or counterclockwise direction.

2. A variable optical attenuator as recited in claim 1 wherein said interlock comprises a set pin that extends through said second housing and fits within a recess in said first housing.

3. A variable optical attenuator as recited in claim 1 wherein said interlock comprises a bolt which is countersunk into said second housing and is tightened against said first housing to restrict the rotation of said first housing relative to said second housing.

4. A variable optical attenuator as recited in claim 1 wherein said interlock comprises rings on the exterior surface of said first housing that interlock with grooves on the interior surface of said second housing.

5. A variable optical attenuator comprising:
    a first housing for maintaining a first optical cable having a core; said first housing having a protruding circular member;
    a second housing for maintaining a second optical cable having a core; said second housing member having a cavity for receiving said protruding circular member;
    said protruding circular member of said first housing having exterior rings and said cavity of said second housing having interior grooves that align with said rings to interlock the first and second housing such that the core of said first optical cable is maintained in axial alignment with the core of said second optical cable at a pre-determined distance and in a manner that permits said first housing to be positioned at any position between zero degrees (0°) and three hundred and sixty degrees (360°) relative to said second housing without varying said pre-determined distance between the core of the first optical cable and the core of the second optical cable and permits such rotation in either a clockwise or counterclockwise direction.

6. A variable optical attenuator as recited in claim 5, further comprising a bolt which is countersunk into said second housing and is tightened against said first housing to restrict the rotation of said first housing relative to said second housing.

7. A variable optical attenuator comprising:
    a first housing for maintaining a first optical cable having a core; said first housing having a protruding circular member;
    a second housing for maintaining a second optical cable having a core; said second housing member having a cavity for receiving said protruding circular member;
    said protruding circular member of said first housing having an exterior recess which extends about the exterior circumference of said member and said second housing having a bore which aligns with the recess of said member when said circular member is positioned inside the cavity of said second member;
    a set pin which is positioned through the bore of said second member and into said recess of said circular member of said first housing such that said set pin interlocks said first housing with said second housing such that the core of said first optical cable is maintained in axial alignment with the core of said second optical cable at a pre-determined distance and in a manner that permits said first housing to be positioned at any position between zero degrees (0°) and three hundred and sixty degrees (360°) relative to said second housing without varying said pre-determined distance between the core of the first optical cable and the core of the second optical cable and permits such rotation in either a clockwise or counterclockwise direction.

8. A variable optical attenuator as recited in claim 7, further comprising a bolt which is countersunk into said second housing and is tightened against said first housing to restrict the rotation of said first housing relative to said second housing.

* * * * *